Aug. 16, 1927.
A. L. PUTNAM
1,639,108
RIM FASTENER FOR VEHICLE WHEELS
Filed Feb. 28, 1918
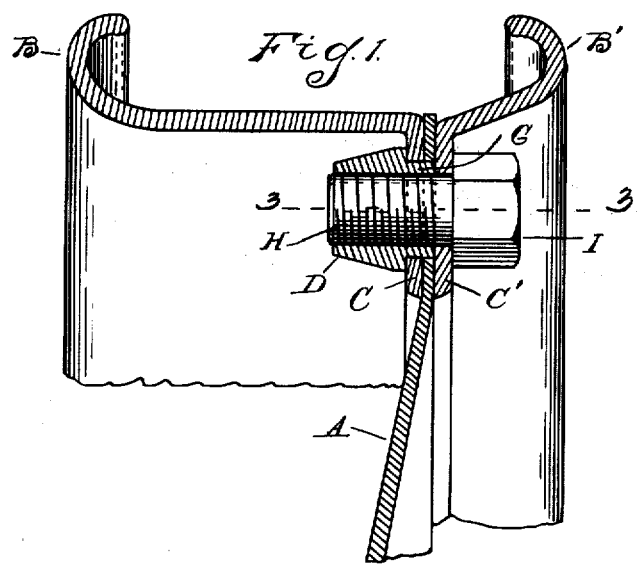
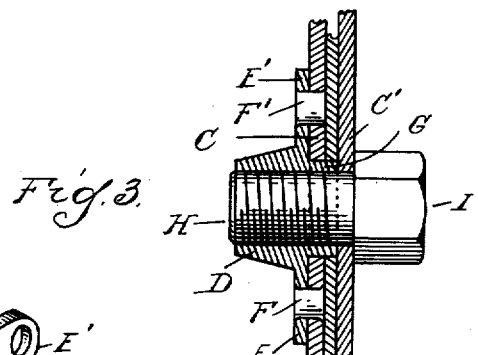
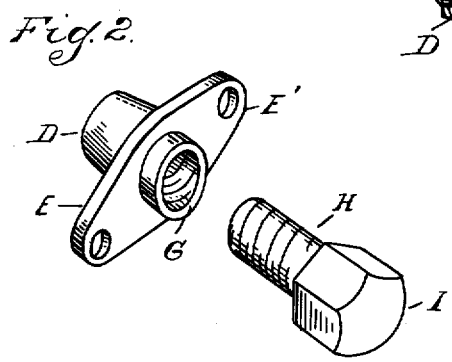
Inventor
Alden L. Putnam
By Whittemore Hulbert & Whittemore
Attorneys Patented Aug. 16, 1927.  1,639,108

UNITED STATES PATENT OFFICE.

ALDEN L. PUTNAM, OF DETROIT, MICHIGAN, ASSIGNOR, BY MESNE ASSIGNMENTS, OF ONE-HALF TO MOTOR WHEEL CORPORATION, OF LANSING, MICHIGAN, A CORPORATION OF MICHIGAN, AND ONE-HALF TO THE MIDLAND STEEL PRODUCTS COMPANY, OF CLEVELAND, OHIO, A CORPORATION OF OHIO.

RIM FASTENER FOR VEHICLE WHEELS.

Application filed February 28, 1918. Serial No. 219,565.

The invention relates to vehicle wheels having metallic rims, being more particularly designed for use in securing said rims to metallic disk wheels, and the invention comprises the novel construction as hereinafter set forth.

In the drawings:

Figure 1 is a cross-section through a wheel rim to which my improved fastener is applied;

Figure 2 is a perspective view of the fastener detached;

Figure 3 is a section on line 3—3 Figure 1.

A is a disk wheel body, and B and B' are complementary portions of a rim to be secured thereto, being provided with inwardly-extending securing flanges C and C' arranged on opposite sides of the disk. Heretofore it has been the usual practice to bolt the flanges of the rim to the disk by cooperating studs and nuts, the studs being secured to one flange member and passing through registering apertures in the other flange member and disk. The engagement of this apertured flange simultaneously with the entire series of studs on opposite sides of the rim is not easily performed unless considerable clearance is provided in the apertures, and in such case the two flanges are not held in exact registration. I have therefore devised a construction in which instead of securing the studs to one flange member the nut is attached thereto and the cooperating flange is secured by a headed bolt engageable with said nut. Furthermore the nut member which is arranged on the rear side of the flange is provided with an annular flange member extending through an aperture in the flange of the rim and projecting beyond said flange a sufficient distance to engage the registering apertures in the disk.

In detail, D is the nut member which is formed with laterally-extending flanges E and E' which are riveted or otherwise secured to the rear face of the flange C, as indicated at F and F'. G is the annular flange projecting from the front face of the nut and passing through an aperture in the flange C to project beyond the same, and H is the bolt having a polygonal head I and a threaded shank for engagement with the threads in the nut.

In operation, the projections G are easily registered and engaged with the apertures in the disk A, after which the flange C' is registered and secured by the bolts H. The nut members D may be made of cast-metal and are separately threaded, which operation may be accomplished more readily than the tapping of a series of apertures in a common member.

What I claim as my invention is:

1. In a wheel the combination with a rim formed in complementary sections having parallel securing flanges with a series of registering apertures therein, a disk member extending between said flanges and having registering apertures, a series of members secured to one of said flange sections and to the face opposite the face abutting against said disk, each of said members having a portion extending through the aperture in said flange and beyond the same to engage the aperture in said disk and being also centrally apertured and threaded, and a corresponding series of headed bolt members threaded to engage said threaded apertures and passing through the flange of the complementary rim member to clamp the same and said disk to the first-mentioned rim member.

2. In a wheel, the combination of a rim having an inwardly extending annular flange, a disc with its periphery contacting with said flange, said flange and disc having a plurality of registering openings, a plurality of plates secured to one of said members in line with said registering openings, said plates each having a threaded portion, and a plurality of fastening members extending through said registering openings and each having a screw thread connection with one of said plates.

3. In a wheel, the combination of a pair of separable rim sections, each having an inwardly extending annular flange, a disc having a peripheral flange alined with said rim-section flanges, said flanges being provided with a plurality of registering openings, a plurality of plates secured to one of said flanges in line with said openings, and a plurality of fastening members each having a screw thread connection with one of said plates and extending through said registering openings.

4. In a wheel, the combination of a pair of separable rim sections each provided with an inwardly extending annular flange, a disc having a peripheral flange alined with said rim-section flanges, said flanges having a plurality of registering openings, a plurality of plates secured to one of said flanges in line with said openings, each plate having an internally threaded bore, and a plurality of bolts extending through said registering openings and each screwed into the bore of one of said plates.

5. In a wheel, the combination of a pair of separable rim-sections each having an inwardly-extending annular flange, a disc having a peripheral flange alined with and disposed between said rim-section flanges, said flanges having a plurality of registering openings, a plurality of female members secured to one of the rim-section flanges, and a plurality of removable and detachable male members extending through said openings and having screw-thread connections with said female members.

6. In a wheel, the combination of a rim provided with an inwardly extending annular flange, a disc having a peripheral flange alined with said rim flange, said flanges having a plurality of registering openings, a plurality of plates secured to one of said flanges and each having a sleeve extending through the registering openings of said flanges, and a plurality of fastening members each having a screw-threaded connection with one of said plates.

7. In a wheel, the combination of a rim provided with an inwardly-extending, annular flange, a disc having a peripheral flange alined with said rim flange, said flanges having registering apertures, a plurality of members rigidly secured to one of said flanges and to the face thereof opposite the face abutting the other flange, and a plurality of fastening bolts extending through said apertures and screwed into said members to clamp the flanges together.

8. In a wheel, the combination of a rim composed of separable sections each having an inwardly-extending, annular flange, a disc having its peripheral portion disposed between said flanges, said disc and flanges having a plurality of registering apertures, a plurality of nut members each including a flanged portion riveted to the inner rim flange and a sleeve extending through said flange and disc, and a plurality of fastening bolts, each having a head engaging the outer rim flange and a shank extending through the registering apertures and screwed into said sleeve.

In testimony whereof I affix my signature.

ALDEN L. PUTNAM.

of separable rim sections each provided with an inwardly extending annular flange, a disc having a peripheral flange alined with said rim-section flanges, said flanges having a plurality of registering openings, a plurality of plates secured to one of said flanges in line with said openings, each plate having an internally threaded bore, and a plurality of bolts extending through said registering openings and each screwed into the bore of one of said plates.

5. In a wheel, the combination of a pair of separable rim-sections each having an inwardly-extending annular flange, a disc having a peripheral flange alined with and disposed between said rim-section flanges, said flanges having a plurality of registering openings, a plurality of female members secured to one of the rim-section flanges, and a plurality of removable and detachable male members extending through said openings and having screw-thread connections with said female members.

6. In a wheel, the combination of a rim provided with an inwardly extending annular flange, a disc having a peripheral flange alined with said rim flange, said flanges having a plurality of registering openings, a plurality of plates secured to one of said flanges and each having a sleeve extending through the registering openings of said flanges, and a plurality of fastening members each having a screw-threaded connection with one of said plates.

7. In a wheel, the combination of a rim provided with an inwardly-extending, annular flange, a disc having a peripheral flange alined with said rim flange, said flanges having registering apertures, a plurality of members rigidly secured to one of said flanges and to the face thereof opposite the face abutting the other flange, and a plurality of fastening bolts extending through said apertures and screwed into said members to clamp the flanges together.

8. In a wheel, the combination of a rim composed of separable sections each having an inwardly-extending, annular flange, a disc having its peripheral portion disposed between said flanges, said disc and flanges having a plurality of registering apertures, a plurality of nut members each including a flanged portion riveted to the inner rim flange and a sleeve extending through said flange and disc, and a plurality of fastening bolts, each having a head engaging the outer rim flange and a shank extending through the registering apertures and screwed into said sleeve.

In testimony whereof I affix my signature.

ALDEN L. PUTNAM.

CERTIFICATE OF CORRECTION.

Patent No. 1,639,108.   Granted August 16, 1927, to

ALDEN L. PUTNAM.

It is hereby certified that the above numbered patent was erroneously issued one-half to "Motor Wheel Corporation, of Lansing, Michigan," and one-half to "The Midland Steel Products Company, of Cleveland, Ohio," a corporation of Ohio, as assignees, whereas said patent should have been issued to "Steel Wheel Corporation, of Lansing, Michigan," a Corporation of Michigan said corporation being assignee, by mesne assignments of the entire interest in said invention as shown by the records of assignments in this office; and that the said Letters Patent should be read with this correction therein that the same may conform to the record of the case in the Patent Office.

Signed and sealed this 18th day of October, A. D. 1927.

Seal.

M. J. Moore,
Acting Commissioner of Patents.

CERTIFICATE OF CORRECTION.

Patent No. 1,639,108.                           Granted August 16, 1927, to

ALDEN L. PUTNAM.

It is hereby certified that the above numbered patent was erroneously issued one-half to "Motor Wheel Corporation, of Lansing, Michigan," and one-half to "The Midland Steel Products Company, of Cleveland, Ohio," a corporation of Ohio, as assignees, whereas said patent should have been issued to "Steel Wheel Corporation, of Lansing, Michigan," a Corporation of Michigan said corporation being assignee, by mesne assignments of the entire interest in said invention as shown by the records of assignments in this office; and that the said Letters Patent should be read with this correction therein that the same may conform to the record of the case in the Patent Office.

Signed and sealed this 18th day of October, A. D. 1927.

Seal.                                            M. J. Moore,
                                                Acting Commissioner of Patents.